June 24, 1930.  E. HUTCHENS  1,767,288
FLAT TIRE BUILDING MACHINE
Filed Dec. 15, 1926  3 Sheets-Sheet 1
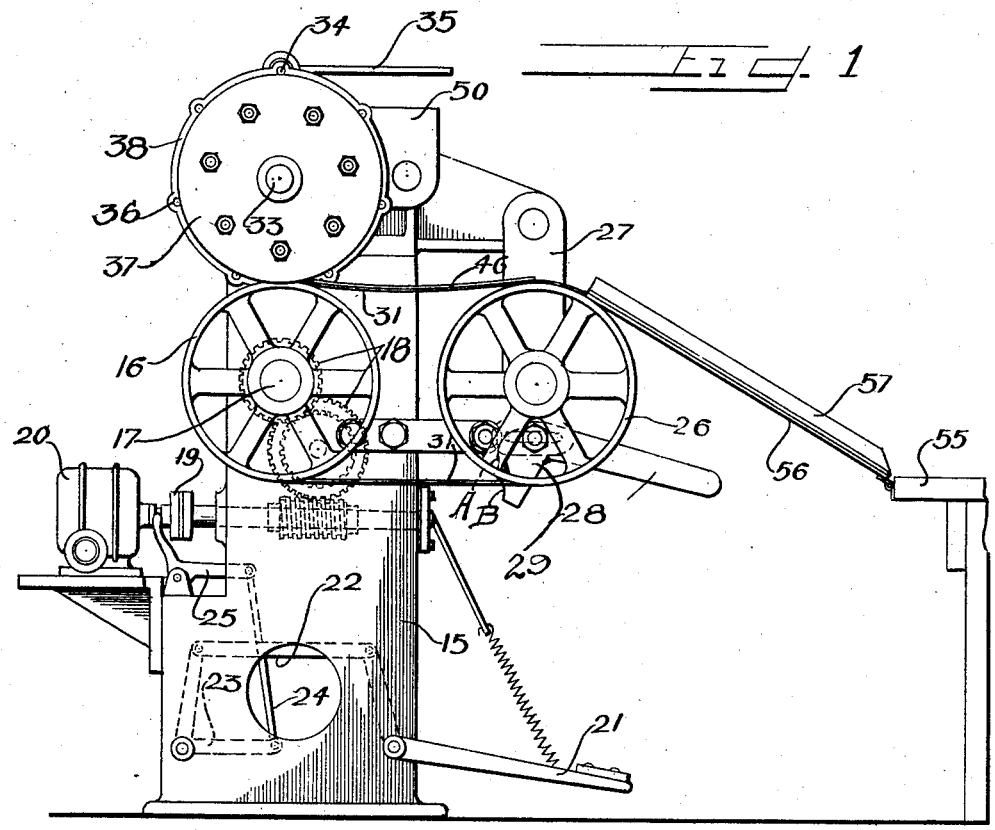
Inventor
Edward Hutchens

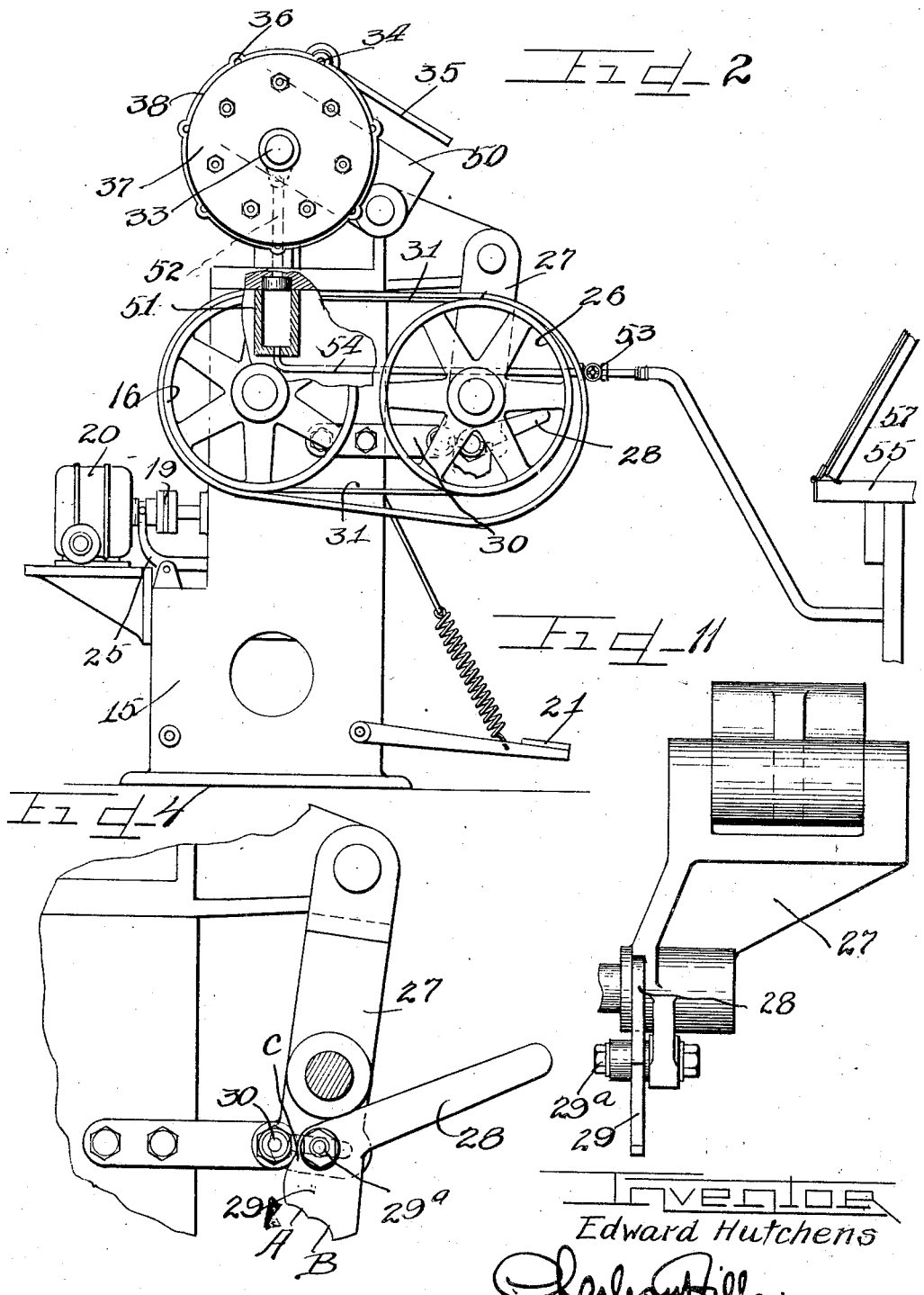

June 24, 1930.  E. HUTCHENS  1,767,288
FLAT TIRE BUILDING MACHINE
Filed Dec. 15, 1926   3 Sheets-Sheet 3
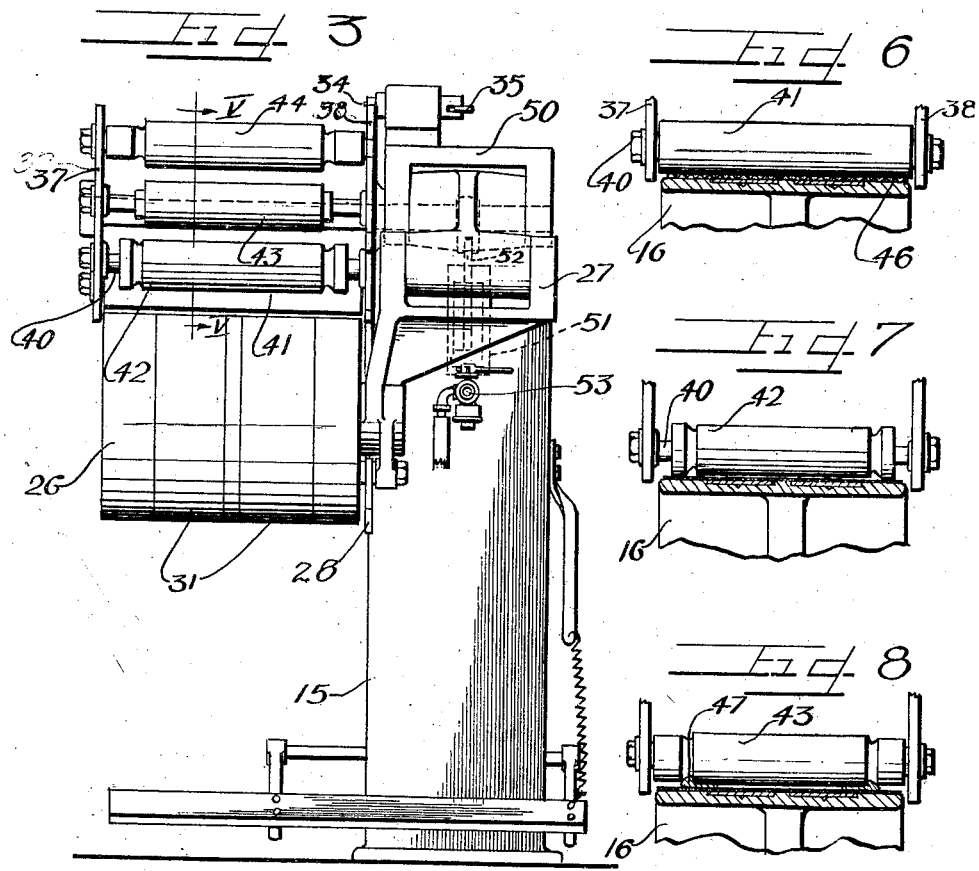
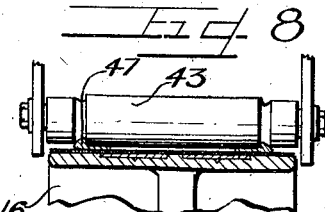
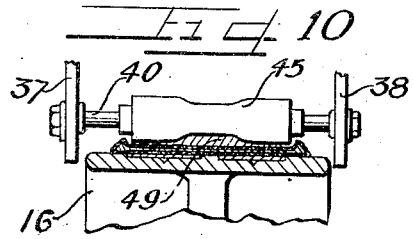
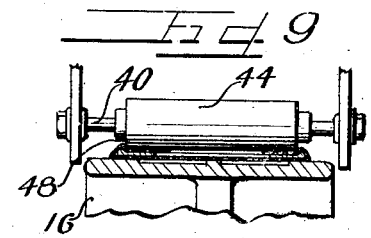
Inventor
Edward Hutchens Patented June 24, 1930

1,767,288

UNITED STATES PATENT OFFICE

EDWARD HUTCHENS, OF MILWAUKEE, WISCONSIN, ASSIGNOR TO UTILITY MANUFACTURING CO., OF CUDAHY, WISCONSIN, A CORPORATION OF WISCONSIN

FLAT-TIRE-BUILDING MACHINE

Application filed December 15, 1926. Serial No. 154,866.

This invention relates to a machine for building up pneumatic tire carcasses, as flat cylinders, prior to distorting the cylinder into the usual annular ring shape and vulcanizing.

Heretofore flat tires have been built on a pulley or drum with or without a depressing segment. The circumference of this drum was fixed and could only be changed by complete alteration or machining.

It is, therefore, the object of this invention to provide a machine that can be quickly adjusted for several sizes of tires, and also a method of changing the circumference during the construction of the tire.

It is well known that the beads of a straight side tire must be made to exact size in order that the tire may properly fit the rim, etc. It has been a difficult matter to place these beads accurately on a flat tire building drum.

This machine provides a method whereby the first plies of fabric lying under the bead as well as the beads may be built on at a lessened circumference, and the machine is then brought to full pre-determined circumference, thereby stretching the beads to full tension and thereafter building on the fabric plies over the beads as well as breaker, cushion tread, etc.

It is also an object of this invention to provide two drums surrounded by elastic bands, one of which is adjustable to give different circumferences during the building of a flat tire, and also for collapsing the machine to permit easy removal of tire when completed without undue stress or distortion that may be caused by removing a tire from a fixed diameter pulley or building drum.
It is also an object of this invention to provide an expandible and power actuated endless feeding belt upon which the tire carcass is built up by successive applications of the various elements entering into the tire carcass.

It is a further object of this invention to provide a turret adapted to present suitable formed rollers successively into position to roll each added element into firm contact with the preceding ones.

Other and further important objects of this invention will be apparent from the disclosures in the specification and the accompanying drawings.

This invention (in a preferred form) is illustrated in the drawings and hereinafter more fully described.

On the drawings:

Figure 1 is a front elevation of a machine embodying the features of this invention.

Figure 2 is an elevation similar to Figure 1 showing the feeding belt contracted to permit the removal of a completed tire carcass.

Figure 3 is a side elevation of the machine.

Figure 4 is a fragmentary detail showing the feed belt contracting mechanism.

Figure 5 is a section through the turret on the line V—V of Figure 3.

Figure 6 illustrates the application of successive layers of the fabric carcass in the first stage.

Figure 7 shows the application of the tire beads to the fabric plies of Figure 6.

Figure 8 is intended to show the addition of extra plies of fabric between the beads.

Figure 9 shows the bottom plies of fabric folded around the beads.

Figure 10 illustrates the application of the tread strip.

Figure 11 is an end view showing the loose pulley expanding mechanism of Figure 4.

As shown on the drawings:

The machine comprises a column 15 carrying a pulley 16 at a convenient working height, the pulley shaft 17 being driven through the reduction gears 18 and clutch 19 by the motor 20. The clutch is controlled by the foot levers 21 through the link 22, bell crank 23, link 24 and shifter 25, shown partly dotted in Figure 1. A second duplicate pulley 26 is freely pivoted in the swinging bracket 27; the lever 28, cam 29 and cam follower 30 serving to swing the pulley 26 out to its extended position, these parts being shown in Figures 4 and 11 in detail. The cam 29 is provided with two shallow notches A and B forming stops holding the cam in position relative to the cam follower 30, the first notch A serving to partially extend the movable pulley for the tire backing up to the application of the beads and the notch B further extending the pulley to stretch the cord fabric and beads to the full bead diameter. The cam pivot 29a is adjustable in a slot in the swinging bracket to provide for accurate adjustment of the tire diameter to the desired size. The cam position marked C in Figure 4 is the fully contracted position of the cam provided to permit release and removal of the completed tire from the machine.

The two pulleys are grooved to receive elastic belts 31 which lie flush with the remaining surface of the pulleys. A revolving turret is pivoted on the spindle 33 and is engaged by a latch pin 34 operated by the lever 35, a latch pin hole 36 being provided for each turret position. The turret comprises front and rear discs 37 and 38 having equally spaced apertures adapted to receive shouldered bars 40 bolted therein to serve as axles for a series of formed rollers. As shown, seven rollers can be accommodated, although only five are detailed, one straight roller 41 smoothing out the initial plies of material 46, the next roller 42 being formed to apply the bead rings 47, the third roller 43 working on extra plies of fabric between the bead rings, the fourth roller smoothing out the first plies of material after they have been folded over the bead rings and adding the side wall stock 48 thereto, and the last roller 45 formed to apply the tread stock 49 as the final operation. The exact number of rollers will of course vary with the size and type of tire, as well as the number of plies of fabric or cord and other material, as for example when the breaker strip is separate from the tread stock.

The turret spindle 33 is carried by a pivoted bracket 50 which permits the turret to be lifted away from the pulleys when a completed tire carcass is to be removed.

One means of accomplishing this is to provide a fluid cylinder or jack 51 shown in Figure 2, the piston rod 52 of which engages about the spindle 33. A control valve 53 is shown on the supply pipe 54 leading to the jack.

The end of feed table 55 is shown in Figures 1 and 2 together with a feeding apron 56 hinged to the end thereof and resting on the pulley 26 when the machine is in operation. This apron is provided with adjustable guides 57 for centering the material fed to the machine.

The operation is as follows:

With the machine as shown in Figure 1, the cam 29 being set on the slightly collapsed notch A, a length of bias cut fabric or angularly laid cords is laid out on the table 55 and brought up the apron until its end lies on the belts 31 after which engaging the clutch 19 draws the fabric up onto the traveling belts and under the first roll 41 on the turret which smoothes out the fabric and builds it up to the required number of plies. It is to be understood that one ply at a time, cut to alternately opposite angles, is customarily applied, the operator stopping the machine when ready to make a lap and trimming the fabric to the desired butt joint. Essentially, however, the building up of the required number of plies forms one operation.

After this operation, the turret is raised by the air cylinder and revolved to bring the roller 42 into operating position and the two bead rings 47 slipped over the plies of fabric and rolled into place after dropping the turret. The beads and cord fabric are then stretched to the desired exact bead diameter by shifting the notch B of the cam 29 into engagement with the follower 30. Some of the fabric pile projects beyond the bead rings and is later turned thereover as shown in Figure 9. The turret is again raised and rotated to bring roller 43 into position whereupon extra fabric plies are fed to the growing tire carcass, it being customary in a four ply tire to have two plies under the beads with their accompanying flipper strip skirts and two plies lying over or outside of the skirts. The turret is again operated to bring roller 44 into position when the side wall stock 48 is fed onto the tire carcass. The final operation comprises rolling the tread stock 49 onto the center of the carcass by means of the roller 45.

To remove the completed carcass, the pulley 26 is released by means of the lever 28 as shown in Figure 2, the elastic belts 31 remaining tight so that the relatively stiff tire carcass may be lifted off without trouble.

I am aware that many changes may be made, and numerous details of construction may be varied through a wide range without departing from the principles of this invention, and I therefore, do not purpose limiting the patent granted hereon, otherwise than necessitated by the prior art.

I claim as my invention:

1. In a machine of the class described an endless feed belt, and a turret positioned over said belt including a plurality of forming rolls adapted to be successively brought into operative position adjacent said belt for combining successive layers of tire building material fed onto said belt into a tire carcass.

2. In a machine of the class described a pair of pulleys, one of which is movable to reduce the center distance therebetween, elastic endless belts running over said pulleys upon which layers of tire building material are adapted to be fed, and a pivoted turret adapted to move a succession of forming rollers into contact with the material on the belt as successive layers are applied thereto.

3. In a tire building machine a driven pulley, an idler pulley, endless belts trained over said pulleys, a revolving turret positioned adjacent one of said pulleys, means for moving said turret away from said pulley and a plurality of tire working means mounted in said turret and adapted to be brought into action at different stages in the process of building up a tire carcass.

4. In a tire building machine a driven pulley, an idler pulley, endless belts trained over said pulleys, means for shifting said idler pulley to permit removal of a completed tire carcass, a revolving turret positioned adjacent one of said pulleys, means for moving said turret away from said pulley and a plurality of tire working means mounted in said turret and adapted to be brought into action at different stages in the process of building up a tire carcass.

5. In a machine of the class described, means adapted to build up cylindrical layers of tire fabric of slightly less than the desired diameter of the tire beads, means for applying the beads thereto, means for expanding the fabric and beads to full size, and means for applying side wall and tread stock thereto.

6. In a flat tire building machine, means for building that portion of a tire up to and including the beads at a circumference less than that required in the finished tire, means for stretching the portion of the tire so built to full size, and means for applying the remaining fabric and tread portions thereto.

7. In combination, an endless belt for supporting fabric to be built into a given shape, and a turret including members extending transversely of and movable into cooperation with said belt so as to form the fabric on the belt into the shape desired.

8. In combination, an endless belt for supporting fabric to be built into a given shape, and a turret including members adapted to be brought into cooperation with said belt so as to form the fabric on the belt into the shape desired, said turret members comprising rollers adapted when in operative position to be rotated by said belt.

9. In a tire building machine, an endless belt for supporting fabric to be built into a tire casing, and means adapted for cooperation with said belt to build the fabric on said belt into a tire casing, said belt being arranged so as to be tightened and whereby it can accommodate fabrics of different diameters going to make up the casing.

10. In combination, means adapted to successively receive and support a plurality of layers of material, and a turret including a plurality of members arranged so as to be successively brought into engagement with said layers of material whereby said layers are formed into a predetermined shape, said means being arranged so as to be tightened and slackened during the building of said layers into said given shape whereby the supporting means can accommodate different layers of material of different diameters.

11. In combination, means for supporting material to be built into a given shape, a turret including a plurality of rollers adapted to be successively brought into engagement with the material on said supporting means so as to form said material into said given shape, and a pivotal support for said turret adapted to enable said turret to be swung into and out of cooperative relation with said means.

12. In combination, an endless belt for supporting fabric to be built into a given shape, a turret including members adapted to be brought into cooperation with said belt so as to form the fabric on the belt into the shape desired, and means for supporting said endless belt including an adjustable pulley, said pulley being adapted to be moved to slacken and tighten said belt so as to enable said belt to accommodate fabric of different sizes.

13. In combination, means adapted to successively receive and support a plurality of layers of material, a turret including a plurality of members arranged so as to be successively brought into engagement with said layers of material whereby said layers are formed into a predetermined shape, means for supporting said turret so as to enable it to be swung into and out of cooperation with the fabric on said supporting means, and automatic means for moving said turret out of cooperation with said fabric.

14. In combination, means adapted to successively receive and support a plurality of layers of material, a turret including a plurality of members arranged so as to be successively brought into engagement with said layers of material whereby said layers are formed into a predetermined shape, means for supporting said turret so as to enable it to be swung into and out of cooperation with the fabric on said supporting means, and automatic means for moving said turret out of cooperation with said fabric, comprising a fluid operated piston operatively associated with said turret.

15. In combination, means adapted to successively receive and support a plurality of layers of material, a turret including a plurality of members arranged so as to be successively brought into engagement with said layers of material whereby said layers are formed into a predetermined shape, means for supporting said turret so as to enable it to be swung into and out of cooperation with the fabric on said supporting means, and means for moving said turret out of cooperation with said fabric, said turret being arranged so that upon the release of said latter means it is free to gravitate into cooperation with said fabric.

16. In combination, means adapted to successively receive and support a plurality of layers of material, and a turret including a plurality of members arranged so as to be successively brought into engagement with said layers of material whereby said layers are formed into a predetermined shape, said supporting means comprising an endless belt trained over pulleys, said pulleys having grooves of substantially the same width as the belt adapted to receive the belt whereby its outer surface is flush with the peripheral surfaces of said pulleys.

17. In combination, an endless belt for supporting fabric to be built into a given shape, a turret including members adapted to be brought into cooperation with said belt so as to form the fabric on the belt into the shape desired, means for supporting said endless belt including an adjustable pulley, said pulley being adapted to be moved to slacken and tighten said belt so as to enable said belt to accommodate fabric of different sizes, and manually operable means for moving said pulley including a pivotally mounted arm carrying said pulley, a manually operable cam member connected to said arm and a fixed element engageable by the cam member to cam said pulley to and from said fixed element, said cam member including a plurality of diferent cam surfaces for holding said pulley in the different positions to which it is moved.

18. In a tire building machine, means for building that portion of a tire up to and including the beads at a circumference less than that required in the finished tire, means for stretching the portion of the tire so built to full size, means for pressing the folded edges of a first ply of fabric on top of and in cooperation with said beads, and means for adding tread stock thereto.

19. In a machine of the class described, means for receiving and supporting a plurality of layers of fabric, and a turret including a plurality of forming members adapted to be successively brought into engagement with said fabric, one of said members comprising a roller shaped to press the turned up edges of one of said layers over and on top of the other layers during the building up of said layers into a predetermined form.

In testimony whereof I have hereunto subscribed my name.

EDWARD HUTCHENS.